(12) United States Patent
Chen

(10) Patent No.: US 7,471,880 B2
(45) Date of Patent: Dec. 30, 2008

(54) DVD-ROM CONTROLLER AND MPEG DECODER WITH SHARED MEMORY CONTROLLER

(75) Inventor: Kuan-Chou Chen, Tainan County (TW)

(73) Assignee: MediaTek Inc., Hsin-Chu (TW)

( * ) Notice: Subject to any disclaimer, the term of this patent is extended or adjusted under 35 U.S.C. 154(b) by 1181 days.

(21) Appl. No.: 10/064,352

(22) Filed: Jul. 4, 2002

(65) Prior Publication Data

US 2004/0005145 A1 Jan. 8, 2004

(51) Int. Cl.
*H04N 7/64* (2006.01)
(52) U.S. Cl. ..................................................... 386/116
(58) Field of Classification Search .................. 386/46; 345/473; 375/240.25
See application file for complete search history.

(56) References Cited

U.S. PATENT DOCUMENTS

| | | | | |
|---|---|---|---|---|
| 5,463,248 A | * | 10/1995 | Yano et al. .................. 257/677 |
| 5,586,306 A | * | 12/1996 | Romano et al. ............. 711/112 |
| 5,838,876 A | * | 11/1998 | Iwamura ..................... 386/125 |
| 5,870,087 A | * | 2/1999 | Chau ........................ 715/500.1 |
| 5,970,208 A | * | 10/1999 | Shim ........................... 386/126 |
| 6,154,222 A | * | 11/2000 | Haratsch et al. ............. 345/473 |
| 6,232,139 B1 | * | 5/2001 | Casalnuovo et al. .......... 438/48 |
| 6,239,981 B1 | * | 5/2001 | Washida et al. ............. 361/760 |
| 6,240,516 B1 | | 5/2001 | Vainsencher |
| 6,859,614 B1 | * | 2/2005 | Cho ........................... 386/124 |
| 7,042,948 B2 | * | 5/2006 | Kim et al. .............. 375/240.25 |
| 2003/0190138 A1 | * | 10/2003 | Yuen et al. ..................... 386/46 |

* cited by examiner

*Primary Examiner*—Thai Tran
*Assistant Examiner*—Tat Chi Chio
(74) *Attorney, Agent, or Firm*—Winston Hsu

(57) ABSTRACT

An electronic circuit has a DVD-ROM controller, an MPEG decoder and a single memory controller. The DVD-ROM controller controls a Disk drive loader to obtain encoded data from a removable media, such as a DVD disk or a VCD disk. The DVD-ROM controller also performs an ECC decoding process to obtain decoded data from the encoded data, and stores the decoded data in an external memory. The MPEG decoder decodes graphics data held in the external memory to generate video data and audio data. The memory controller provides read and write access to the external memory for both the DVD-ROM controller and the MPEG decoder. The MPEG decoder performs an MPEG decoding process on the decoded data held in the external memory to generate the video data.

13 Claims, 6 Drawing Sheets

DVD-ROM CONTROLLER AND MPEG DECODER WITH SHARED MEMORY CONTROLLER

BACKGROUND OF INVENTION

1. Field of the Invention

The present invention relates to circuitry for video players. More specifically, a single chip electronic circuit is disclosed. The single chip electronic circuit comprises a digital video disk read-only-memory (DVD-ROM) controller circuit and a Moving Picture Experts Group (MPEG) decoder circuit. The former performs servo control and Error Correction Code (ECC) coding while the latter performs audio and video decoding, and both circuits utilize the same memory controller.

2. Description of the Prior Art

Because of its significantly improved video and audio qualities, the digital video disk (DVD) standard has begun to make significant headway into the entertainment market, and is beginning to displace the traditional videocassette tape formats, such as vertical helix scan (VHS), or the traditional audio and video format encoded on a CD-ROM disk, such as video compact disk (VCD). To be more compatible with the old system, most DVD players are capable of reading both DVD disks and VCD disks. Therefore, more and more users are buying DVD players to replace, or at least augment, their older VHS or VCD equipment. This benefits the industry, as a new market is forming and many products are needed. Consumers also benefit as DVDs require less storage space, offer higher video and audio resolutions, and furthermore are capable of offering a host of flexible settings and options that are simply unavailable under the old VHS or VCD systems. Perhaps the only drawback to the new DVD standard is that the typical consumer, having already invested in an older system, is unwilling to spend additional sums of money to upgrade to the newer DVD technology, despite all the inherit benefits of doing so. Consequently, it is desirable to bring down the cost of a DVD player to lower the financial barrier for such consumers.

Please refer to FIG. 1. FIG. 1 is a block diagram of a typical prior art DVD player 10. The DVD player 10 provides an audio signal to an audio device 8, and a video signal to a display device 9. The audio device 8 may be, for example, a home stereo system, and the display device 9 may be a television set. Alternatively, the DVD player 10 may be part of a handheld system that includes a liquid crystal display (LCD) as the display device 9, and one or more speakers (or an audio output jack for headphones) as the audio device 8. The DVD player 10 generates the audio and video signals by reading a DVD disk or a VCD disk, and has a disk drive loader 12 that is capable of reading such types of disks. That is, the disk drive loader 12 can read both DVD disks and VCD disks. To be noted, in advanced designs, the disks need not be read-only in nature, i.e., ROMs, but could also be writable-type disks as well, such as CD-R disks, CD-RW, DVD+RW disks, etc. The disk drive loader 12 includes a platter mechanism 12a for loading and unloading the disks, a spindle motor 12b to provide the appropriate rotational velocity to such disks, and a pick-up head 12c to read digital data that is optically encoded on the disks.

A DVD-ROM controller 20 is provided within the DVD player 10 to control the disk drive loader 12 and to decode the data read from the disk drive loader 12. In particular, the data stored on the disks is encoded in a special manner to provide for error correction coding (ECC), and it is necessary to perform an ECC decoding process upon this encoded data so as to extract the decoded data that is intended for use. The decoding method used will depend upon the type of disk being read within the disk drive loader 12. The DVD-ROM controller 20 includes a servo control and ECC decoder 22, an IDE or A/V bus interface circuit 24, and a memory controller 26. The servo control and ECC decoder 22 controls the disk drive loader 12 to extract encoded data from a disk held within the platter mechanism 12a by controlling the spindle motor 12b and pick-up head 12c. The servo control and ECC decoder 22 utilizes the memory controller 26 to save the ECC encoded data streaming from the disk drive loader 12 into drive random access memory (RAM) 16 as ECC encoded data 16a. The memory controller 26 provides a memory interface for the disk drive loader 12 and servo control and ECC decoder 22 to read from and write to the drive RAM 16. The drive RAM 16 can be, for example, dynamic RAM (DRAM), static RAM (SRAM), synchronous DRAM (SDRAM), etc. The servo control and ECC decoder 22 utilizes the memory controller 26 to then read ECC encoded data 16a from the drive RAM 16 and convert the ECC encoded data 16a into ECC decoded data 16b that is also stored within the drive RAM 16.

The bus interface 24 permits the DVD-ROM controller 20 to communicate with a bus 14 within the DVD player 10, and hence with a Moving Picture Experts Group (MPEG) decoder 30. The bus interface 24 is typically designed to interface with an Integrated Drive Electronics (IDE) bus, or any proprietary audio/video (A/V) bus. The MPEG decoder 30 has a similar bus interface 34, as the MPEG decoder 30 is also usually a single integrated chip. When a block (typically a sector) of newly decoded data 16b has become available in the drive RAM 16, the DVD-ROM controller 20 utilizes the bus interface 24 to signal the availability of the newly decoded data 16b to the MPEG decoder 30. The MPEG decoder 30 then utilizes its bus interface 34 to request and receive the decoded data 16b from the DVD-ROM controller 20 and store it in graphics RAM 18 as graphics data 18a. Depending upon the graphics data 18a, an MPEG processor 32 within the MPEG decoder 30 is capable of performing an MPEG type-1 or an MPEG type-2 decoding process on the graphics data 18a to generate audio data 18b and video data 18c. The audio data 18b and video data 18c are then respectively streamed by the MPEG decoder 30 to the audio device 8 and display 9. As with the DVD-ROM controller 20, the MPEG decoder 30 has a memory controller 36 that permits the MPEG decoder 30 to read from and write to the graphics RAM 18, which is external to the MPEG decoder chip 30.

The prior art DVD player 10 requires two separate memory controllers 26 and 36, which is a source of extra complexity and hence leads to higher productions costs. Additionally, two separate RAM banks 16 and 18 are used, which adds additional components to the DVD player 10, and thus additional expense

SUMMARY OF INVENTION

It is therefore an objective of this invention to provide a DVD-ROM controller and an MPEG decoder that both share the same memory controller. It is also an objective of the present invention to provide a single integrated chip that provides both DVD-ROM controller functionality and MPEG decoder functionality. It is yet another objective to provide a single external memory that is shared by both a DVD-ROM controller and an MPEG decoder.

Briefly summarized, the preferred embodiment of the present invention discloses an electronic circuit having a DVD-ROM controller, an MPEG decoder and a single memory controller. The DVD-ROM controller controls a DVD drive to obtain encoded data from a removable media, such as a DVD disk or a VCD disk. The DVD-ROM controller also performs an ECC decoding process to obtain ECC decoded data from the ECC encoded data, and stores the ECC decoded data in an external memory. The MPEG decoder performs video and audio decoding from graphics data held in the external memory to generate video and audio data. The memory controller provides read and write access to the external memory for both the DVD-ROM controller and the MPEG decoder.

It is an advantage of the present invention that a single memory controller is used for both the DVD-ROM controller and the MPEG decoder. This reduces the overall complexity of the circuit design, and thereby lowers costs. It is a further advantage of the present invention that a single external memory is shared by both the DVD-ROM controller and the MPEG decoder, further simplifying the overall design of a DVD player by reducing the total number of required components.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
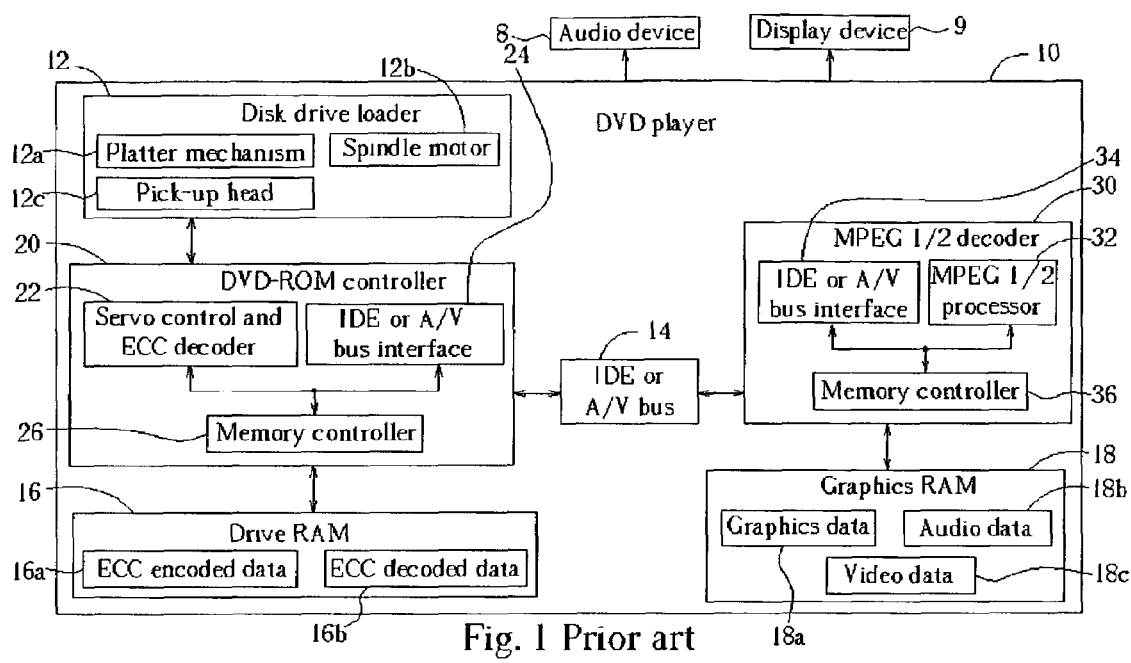
FIG. 1 is a block diagram of a prior art DVD-ROM player.
Figure 2:
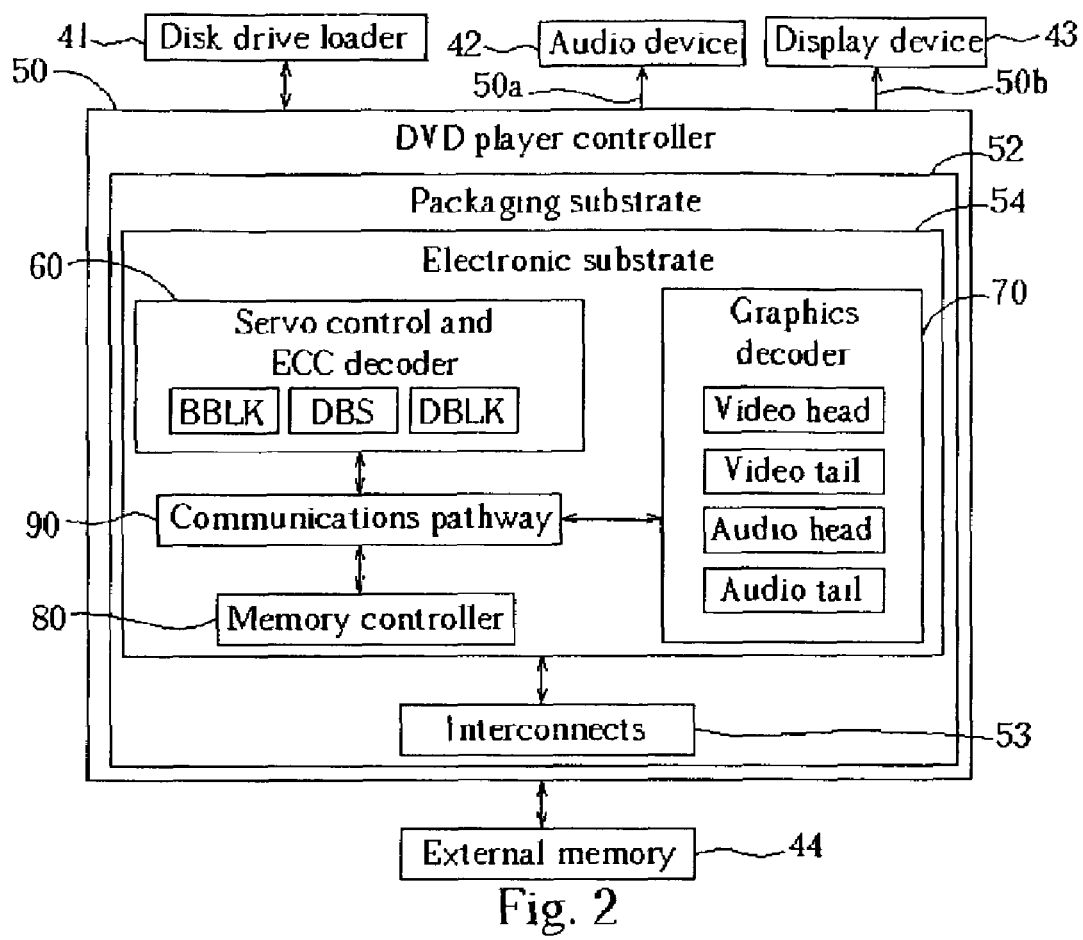
FIG. 2 is a block diagram of a DVD player controller according to the preferred embodiment of the present invention.

Please refer to FIG. 2. FIG. 2 is a block diagram of a DVD player controller 50 according to the preferred embodiment of the present invention. The DVD player controller 50 is used to control a disk drive loader 41, to send audio signals 50*a* to an audio device 42, and to send video signals 50*b* to a display device 43. The disk drive loader 41, audio device 42 and display device 43 are analogous to those of the prior art. The DVD player controller 50 is presented as an electronics package 52 having a plurality of interconnects 53 to establish electrical connections to other devices, such as external memory 44, in a manner familiar to those in the art of electronics. The interconnects 53 are electrically connected to a monolithic semiconductor substrate 54, such as silicon, onto which all of the electronic circuits of the DVD player controller 50 are disposed. The packaging substrate 52 encases, and hence protects, the electronic substrate 54. The electronic circuits include a servo control and ECC decoder 60, a graphics decoder 70, a memory controller 80 and a communications pathway 90. The servo control and ECC decoder 60 is used to control a removable media drive, such as the disk drive loader 41, and to decode ECC-encoded data obtained from such a removable media drive. The graphics decoder 70 is used to decode graphics data to generate the audio signal 50*a* and the video signal 50*b*. In particular, the graphics decoder 70 can perform both an MPEG type-1 and an MPEG type-2 decoding process on suitably encoded graphics data to generate the audio signal 50*a* and the video signal 50*b*. The memory controller 80 provides an interface through which both the servo control and ECC decoder 60 and the graphics decoder 70 access the external memory 44 for reading and writing operations. Hence, the servo control and ECC decoder 60 and the graphics decoder 70 both use the same memory controller 80 to access the external memory 44. Finally, the communications pathway 90 enables the servo control and ECC decoder 60, the graphics decoder 70 and the memory controller 80 to communicate with each other. It should be noted here that, as all the electronic circuits 60, 70 and 80 are fabricated on the same semiconductor substrate 54, it is not necessary for the communications pathway 90 to conform to any particular standard. That is, the communications pathway 90 does not need to be an IDE or A/V interface. The communications pathway 90 is free to be as simple as possible, and does not need to be redundantly duplicated for both the servo control and ECC decoder 60 and the graphics decoder 70. This offers the potential for considerable easing of the circuit complexity of the DVD player controller 50.

Figure 3:
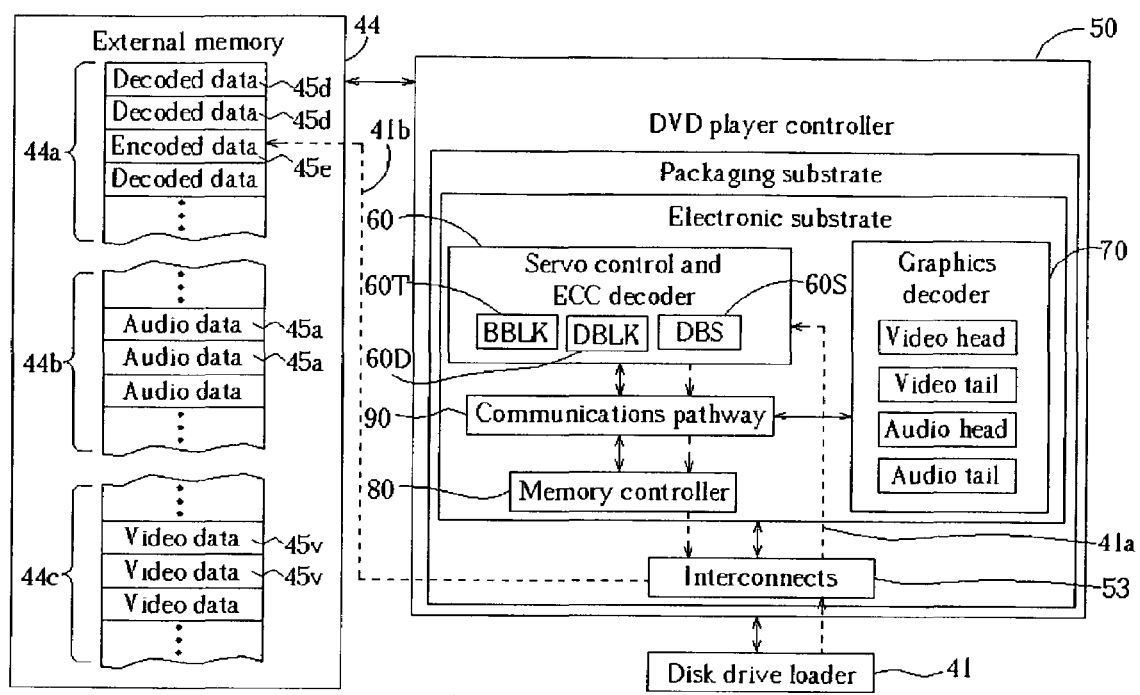
FIG. 3 is a block diagram illustrating usage of external memory by a servo control and ECC decoder of the present invention during a read operation from a removable media drive.

The servo control and ECC decoder 60, and the graphics decoder 70, use the external memory 44 as a scratch pad to perform their respective functions. In this embodiment the external memory 44 is RAM, and may be DRAM, SRAM, SDRAM, RDRAM or the like. Please refer to FIG. 3. FIG. 3 is a block diagram illustrating usage of the external memory 44 by the servo control and ECC decoder 60 during a reading operation from the disk drive loader 41. The external memory 44 is shared by both the servo control and ECC decoder 60, and the graphics decoder 70. In this embodiment, the DVD player controller 50 divides the external memory 44 into three logical circular buffers: a drive area 44*a* for the servo control and ECC decoder 60, an audio area 44*b* to hold audio data 45*a* generated by the graphics decoder 70, and a video area 44*c* to hold video data 45*v* generated by the graphics decoder 70. The servo control and ECC decoder 60 controls the disk drive loader 41 to read ECC-encoded data from a DVD disk or a VCD disk. Typically, data is read a sector or more at a time from the disk drive loader 41. A buffer block (BBLK) register 60T within the servo control and ECC decoder 60 indicates the storage location in the memory 44 for encoded data streaming from the disk drive loader 41. As shown in FIG. 3, encoded data 41*a* streams from the disk drive loader 41 and through the interconnects 53 to the servo control and ECC decoder 60. The servo control and ECC decoder 60 uses the BBLK register 60T to determine where in the drive region 44*a* the encoded data should go. The encoded data thus streams, as shown by arrow 41*b*, from the servo control and ECC decoder 60 through the communications pathway 90 to the memory controller 80, which then controls the memory 44 so that the encoded data lands into its appropriate spot within an encoded data section 45*e* as given by the BBLK register 60T. After one whole block of ECC-encoded data is stored into the memory 44, the Servo control and ECC decoder 60 will advance the BBLK register 60T to indicate the position in which the next ECC-encoded data should be written. In order to avoid the overwriting of ECC-encoded, the Servo control and ECC decoder 60 should examine the contents of data section given by the advanced position of BBLK and make certain that this area of memory has been processed by the graphics decoder 70. Otherwise, The Servo control and ECC decoder 60 should not advance the BBLK register 60T.

Figure 4:
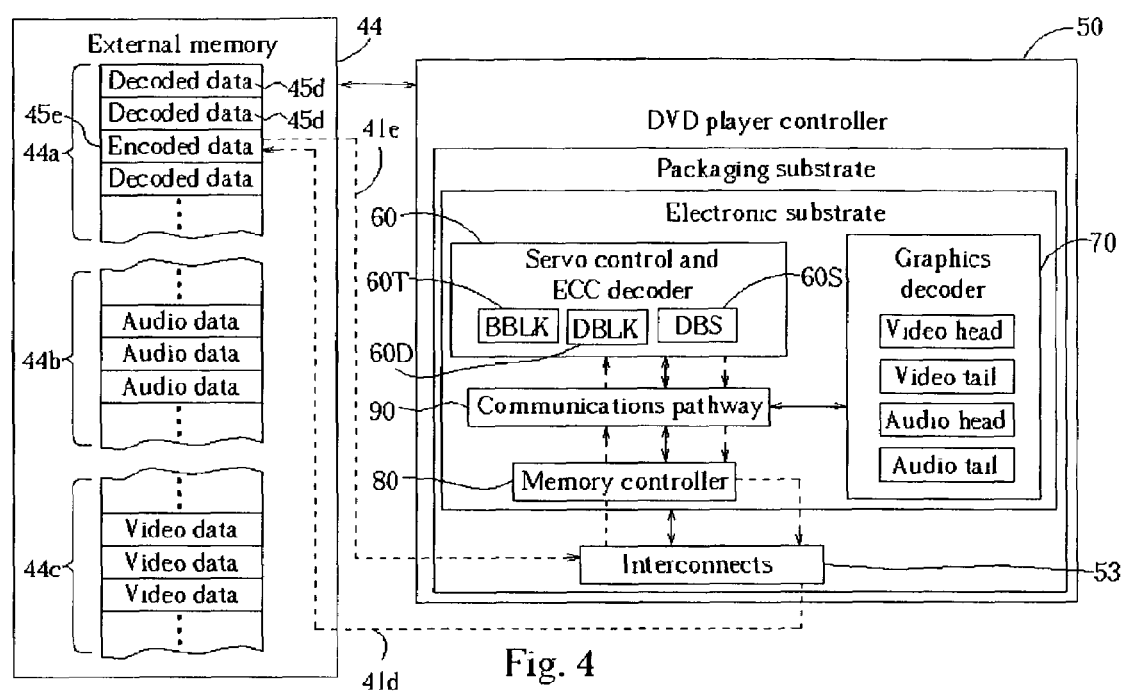
FIG. 4 is a block diagram illustrating the usage of external memory when a servo control and ECC decoder of the present embodiment performs an ECC decoding process on encoded data to generate decoded data.
Figure 5:
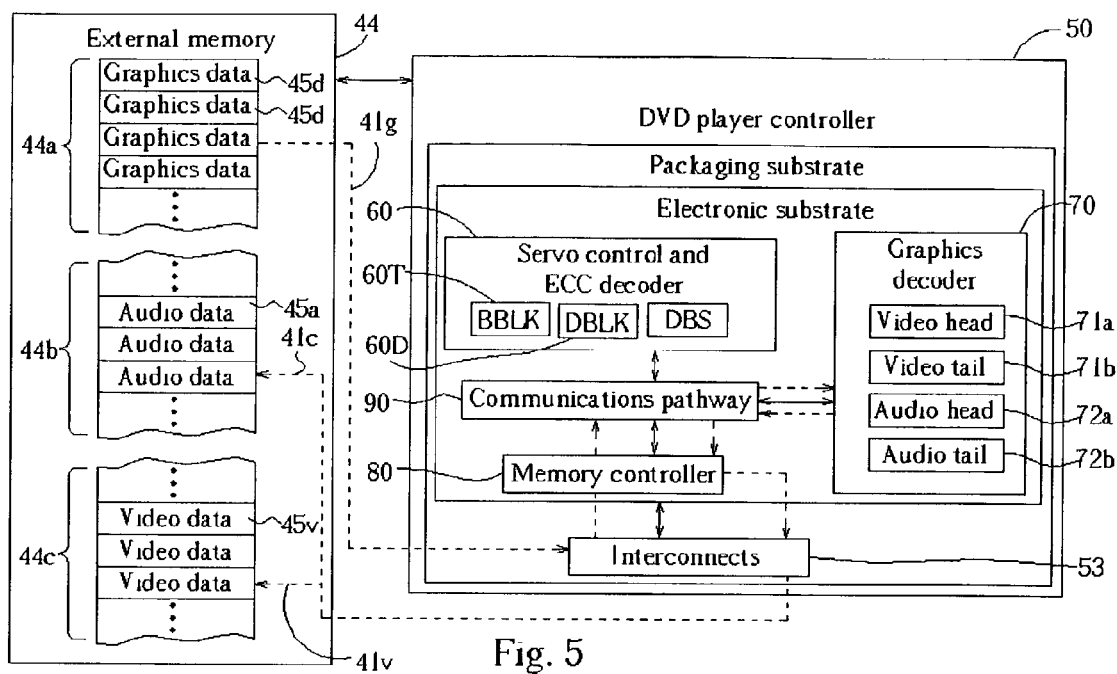
FIG. 5 is a block diagram illustrating usage of external memory when a graphics decoder of the present invention performs a graphics decoding process on graphics data to generate audio and video data.
Figure 6:
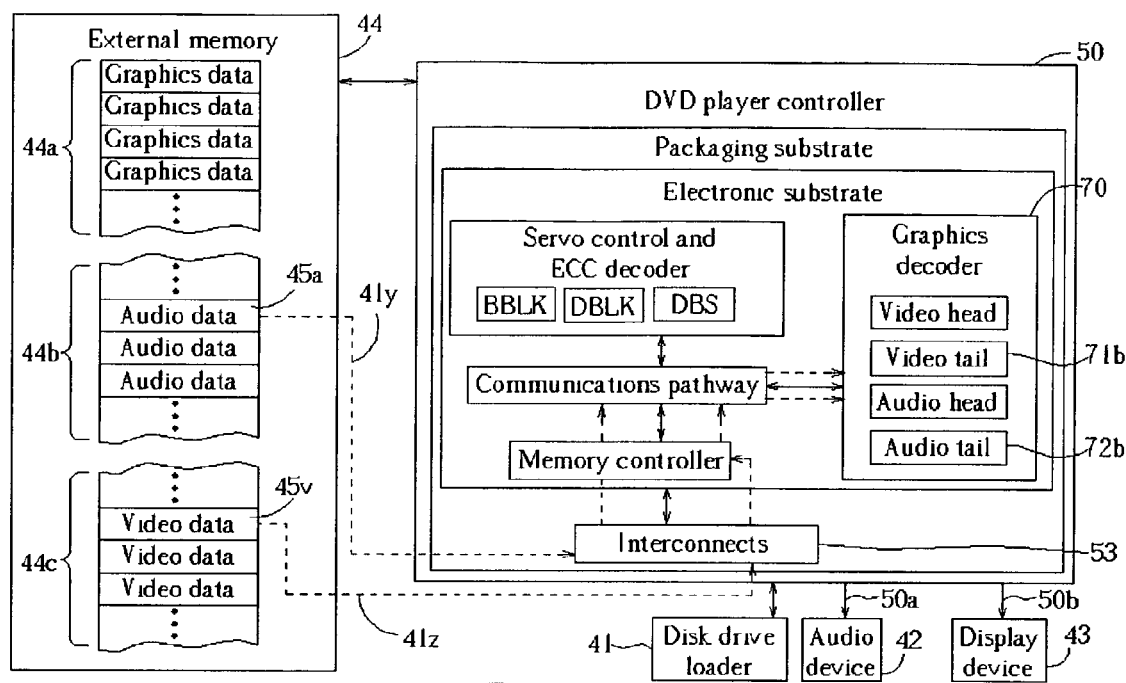
FIG. 6 illustrates a present invention graphics decoder reading audio data and video data from an external memory.

Please refer to FIG. 4. FIG. 4 is a block diagram illustrating the usage of the external memory 44 when the servo control and ECC decoder 60 performs a decoding process on encoded data 45e to generate corresponding decoded data 45d. As shown by arrow 41e, the encoded data 45e streams from the drive region 44a, through the interconnects 53 to the memory controller 80, which then passes the encoded data 45e onto the servo control and ECC decoder 60 by way of the communications pathway 90. The servo control and ECC decoder 60 performs an ECC decoding process upon the received encoded data 45e to generate corresponding decoded data 45d. A decoding block (DBLK) register 60D in the servo control and ECC decoder 60 indicates where in the drive region 44a the newly decoded data 45d is to go. The DBLK register 60D typically indicates the same region from which the corresponding encoded data 45e originated. That is, the storage location of the decoded data 45d may overlap the storage location of the encoded data 45e, and the decoded data 45d typically overwrites its corresponding encoded data 45e. The memory controller 80 then deposits the decoded data 45d into its proper location within the memory 44 as given by the DBLK register 60D. A decoding block size (DBS) register 60S within the servo control and ECC decoder 60 indicates the size of the new decoded data block 45d, which is useful information for the graphics decoder 70. Please refer to FIG. 5. FIG. 5 is a block diagram illustrating usage of the external memory 44 when the graphics decoder 70 performs a graphics decoding process on graphics data to generate audio and video data. As previously noted, the graphics decoder 70 is capable of performing an MPEG type-1 (MPEG-1), MPEG type-2 (MPEG-2) or other decoding process to generate audio and video data. In particular, it is assumed that the decoded data 45d of FIGS. 3 and 4 in the drive area 44a of the external memory 44 is in fact graphics data 45d (as shown in FIG. 5) that is encoded in the MPEG-1, MPEG-2 or other graphics compression/encoding format. In a manner well known to those skilled in the art, it is possible to differentiate the various applicable encoding schemes applied to the graphics data 45d, and the graphics decoder 70 employs the appropriate graphics decoding process to this graphics data 45d to generate audio and video information. With respect to FIG. 5, then, the graphics data 45d is simply the decoded data 45d of FIGS. 3 and 4, but is now considered from the point of view of the graphics decoder 70. Upon becoming aware of new graphics data 45d being available in the external memory 44, the graphics decoder 70, through the communications pathway 90, accesses the DBLK register 60D to determine the location of the new graphics data 45d, and the DBS register 60S to determine the size of the graphics data 45d. The graphics decoder 70 then uses the memory controller 80 to access the graphics data 45d. As shown by arrow 41g, the graphics data 45d passes through the interconnects 53, memory controller 80 and communications pathway 90 on its way to the graphics decoder 70. The graphics decoder 70 processes the graphics data 45d, performing a graphics decoding process, such as an MPEG-1 or MPEG-2 decoding process, upon the graphics data 45d to generate audio data 45a and video data 45v. The audio data 45a is stored in the audio area 44b, and the video data 45v is stored in the video area 44c. A video head register 71a within the graphics decoder 70 serves as a head pointer for the video area 44c, and indicates where the newest video data 45v should be stored in the external memory 44. Similarly, an audio head register 72a serves as the head pointer for the audio area 44b, indicating where the newest audio data 45a is to be stored in the external memory 44. A video tail register 71b points to the tail position of the video area 44c, indicating the oldest unused video data 45v which has not been sent to the display device, and an audio tail register 72b is similarly provided for the audio area 44b. The graphics decoder 70 stops the graphics decoding process to prevent either of the head pointers 71a, 72a from writing over its corresponding tail pointer 71b, 72b, thereby preventing loss of audio data 45a or video data 45v through buffer overruns, and resumes when the tail 71b, 72b advances close enough to its corresponding head 71a, 72a to free up sufficient space in the circular buffers 44b, 44c. The head pointers 71a, 72a are advanced as data 45a, 45v is written into its corresponding circular buffers 44b, 44c. Arrows 41c and 41v respectively represent the path that that audio data 45a and the video data 45v take from the graphics decoder 70 to the external memory 44. Please refer to FIG. 6. FIG. 6 illustrates the graphics decoder 70 reading audio data 45a and video data 45v from the external memory 44. The circular buffers 44b and 44c ensure that a steady stream of audio data 45a and video data 45v is available to provide consistently advancing audio signals 50a and video signals 50b to the audio device 42 and display device 43, respectively. By providing buffering, inconsistencies in data fetching rates from the disk drive loader 41 are smoothed out by the circular buffers 44b and 44c. At regular intervals, utilizing the memory controller 80, the graphics decoder 70 fetches and synchronizes the oldest audio data 45a and video data 45v from the external memory 44. The positions of this data 45a and 45v are respectively indicated by the audio tail register 72b and video tail register 71b. As audio data 45a and video data 45v are fetched from the external memory 44, the corresponding tail pointers 72b and 71b are advanced, thus freeing up space in their associated circular buffers 44b and 44c. Arrow 41y indicates the path traversed by audio data 45a as it is fetched from the external memory 44 by the graphics decoder 70. Arrow 41z shows the corresponding path of the video data 45v. The graphics decoder 70 utilizes the fetched audio data 45a to generate the audio signal 50a, and utilizes the fetched video data 45v to generate the video signal 50b. In contrast to the prior art, the present invention provides a single memory controller for both a graphics decoder and a servo control and ECC, thereby reducing the total complexity required of a DVD player. Furthermore, by integrating both the servo control and ECC decoder, and the graphics decoder, onto the same chip, the present invention frees a circuit designer to use any interface he or she desires as a communications pathway between the various components of the chip. This further reduces the overall circuit complexity, as industry standard, or proprietary standards, do not need to be individually supported by the graphics decoder and the device driver and decoder for bus interface protocols. Finally, the present invention enables a single external memory to be utilized by both the device driver and decoder and the graphics decoder, further reducing the total number of components required in a DVD player. Although the preferred embodiment utilizes a memory that is physically external to the circuit of the present invention, it should be clear to one skilled in the art that it is possible to provide the memory as part of the present invention circuit. That is, with reference to FIG. 2, it is possible for the external memory 44 to be incorporated into the packaging substrate 52, or even to be part of the same electronic substrate 54. Hence, the term "external" as applied to memory is used simply to indicate that the memory is outside of the present invention DVD player controller circuit, and should not be inferred to mean that the memory must be physically external to the present invention circuit or chip. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electronic circuit comprising:
a servo control and ECC decoder circuit . . . wherein the servo control and ECC decoder circuit further comprises a register accessible by the graphics decoding circuit that indicates the location of decoded data in the external memory, wherein the communication pathway directly links the servo control and ECC decoder circuit with the graphics decoding circuit, and the register accessible by the graphics decoding circuit enables the graphics decoding circuit to directly access the decoded data through the memory controller.

2. The electronic circuit of claim 1 wherein the graphics decoding circuit utilizes the memory controller to store the video data in the external memory.

3. The electronic circuit of claim 1 further comprising video output circuitry for generating a video signal for an external display device according to the video data.

4. The electronic circuit of claim 1 wherein the servo control and ECC decoder circuit comprises a signal to indicate to the graphics decoding circuit that newly decoded data is available in the external memory.

5. The electronic circuit of claim 1 wherein the servo control and ECC decoder circuit is adapted to decode data received from a digital video disk (DVD) removable media, or a compact disk (CD) removable media.

6. The electronic circuit of claim 5 wherein the servo control and ECC decoder circuit is adapted to control a DVD-type drive, or a CD-type drive.

7. The electronic circuit of claim 1 wherein the graphics decoding circuit performs a Moving Picture Experts Group (MPEG) type graphics decoding process to generate the video data.

8. An electronic circuit fabricated on a monolithic substrate, the circuit comprising:
a servo control and ECC decoder circuit for controlling . . . a third register indicating a size of the decoded data; wherein the communication pathway directly links the servo control and ECC decoder circuit with the graphics decoding circuit, and the register accessible by the graphics decoding circuit enables the graphics decoding circuit to directly access the decoded data through the memory controller.

9. The electronic circuit of claim 8, wherein the second storage location overlaps the first storage location.

10. The electronic circuit of claim 8, wherein the graphics decoder circuit further comprises:
a video head pointer indicating a first address where a newest video data is stored in the external memory;
an audio head pointer indicating a second address where a newest audio data is stored in the external memory;
a video tail pointer indicating a third address where an oldest video data is stored in the external memory;
an audio tail pointer indicating a fourth address where an oldest audio data is stored in the external memory,
wherein the video head pointer and the video tail pointer constitute a video circular buffer in the external memory, and the audio head pointer and the audio tail pointer constitute an audio circular buffer in the external memory.

11. The electronic circuit of claim 10, wherein the graphics decoder circuit stops the graphics decoding process when either the video head pointer is about to write over the video tail pointer or the audio head pointer is about to write over the audio tail pointer, so as to prevent loss of the video data or the audio data respectively.

12. The electronic circuit of claim 10, wherein the graphics decoder circuit resumes the video tail pointer when the video tail pointer advances close enough to the video head pointer, or resumes the audio tail pointer when the audio tail pointer advances close enough to the audio head pointer.

13. The electronic circuit of claim 8, wherein the communications pathway enables the servo control and ECC decoder circuit, the graphics decoding circuit and the memory controller to directly exchange information with each other, and the second register is accessible by the graphics decoding circuit for enabling the graphics decoding circuit to directly access the decoded data through the memory controller.

* * * * *